United States Patent [19]
Liu

[11] Patent Number: 5,860,925
[45] Date of Patent: Jan. 19, 1999

[54] ULTRASOUND SCAN CONVERSION METHOD

[75] Inventor: Dong-Chyuan Liu, Mercer Island, Wash.

[73] Assignee: Siemens Medical Systems, Inc., Iselin, N.J.

[21] Appl. No.: 883,777

[22] Filed: Jun. 27, 1997

[51] Int. Cl.⁶ .................................................. A61B 08/00
[52] U.S. Cl. ........................ 600/443; 600/447; 348/442
[58] Field of Search ................................. 600/455, 447, 600/459, 443, 437; 128/916; 395/124, 164, 121

[56] References Cited

U.S. PATENT DOCUMENTS

| | | | |
|---|---|---|---|
| 4,449,199 | 5/1984 | Daigle . | |
| 4,581,636 | 4/1986 | Blaker et al. . | |
| 5,101,475 | 3/1992 | Kaufman et al. | 395/124 |
| 5,123,085 | 6/1992 | Wells et al. | 395/121 |
| 5,197,037 | 3/1993 | Leavitt | 600/447 |
| 5,282,269 | 1/1994 | Willems et al. | 395/164 |
| 5,396,890 | 3/1995 | Weng . | |
| 5,429,137 | 7/1995 | Phelps et al. | 600/455 |
| 5,528,302 | 6/1996 | Basoglu . | |

*Primary Examiner*—William E. Kamm
*Assistant Examiner*—Maulin Patel

[57] ABSTRACT

A scan conversion method employing a graphical circle generator to calculate a circle having a predetermined radius in the raster domain. The resulting set of $(x,y)$ points are assigned values from corresponding vector domain points using closest fit and interpolation methods. This process occurs for each value of r in the vector domain. Gaps in the pixel display resulting from quantization errors in the circle generation algorithm are accommodated via a gap interpolation method. In one embodiment, the Bresenham circle generator is employed.

27 Claims, 6 Drawing Sheets

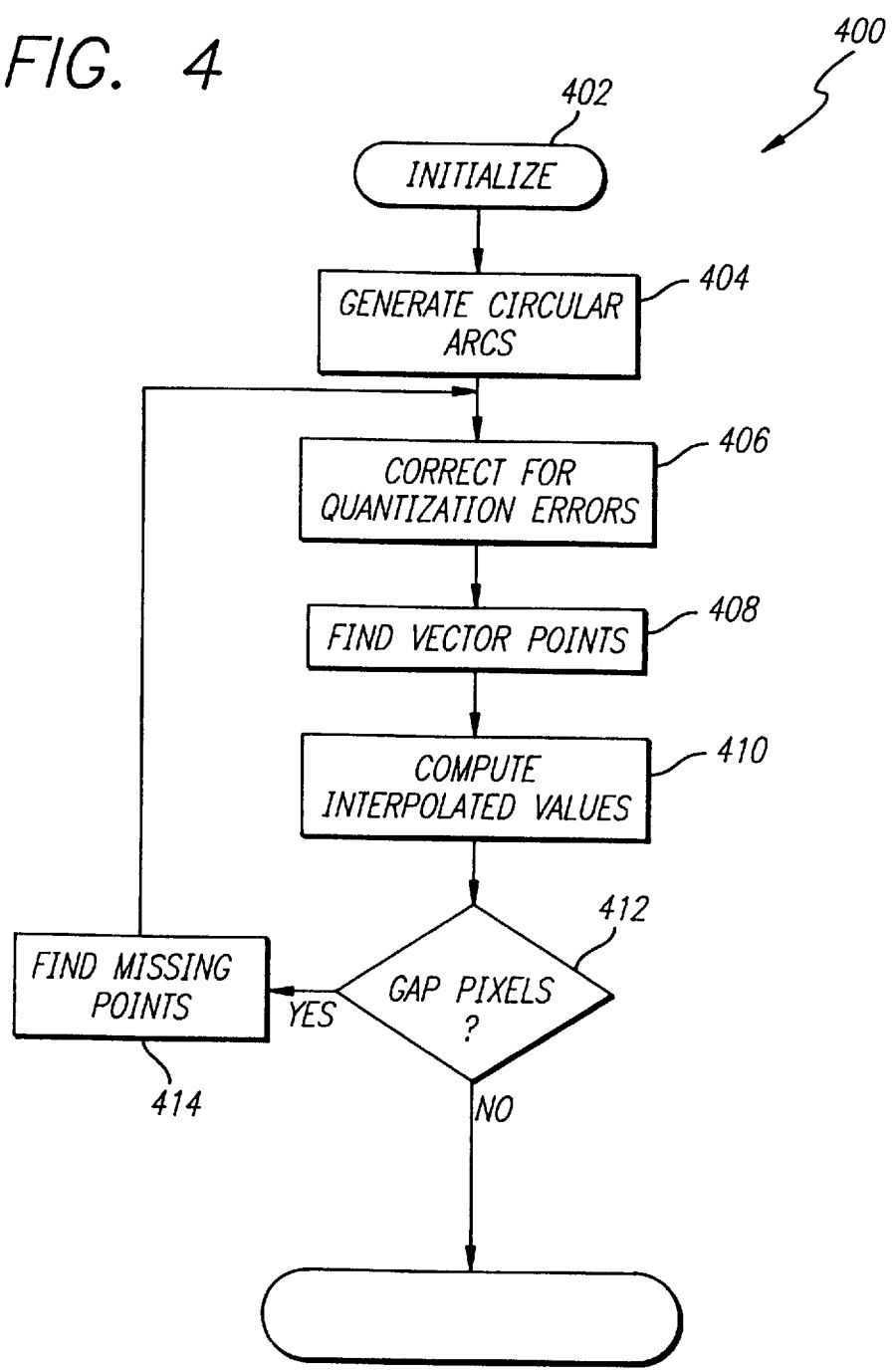

ULTRASOUND SCAN CONVERSION METHOD

BACKGROUND OF THE INVENTION

1. Field of the Invention

The present invention relates to scan conversion systems and, more particularly, to scan conversion systems for use in ultrasound imaging.

2. Description of the Related Art

In ultrasound imaging systems, ultrasound signals are transmitted into a patient's body via a transducer array. Reflected ultrasound signals are received at transducer elements which convert the reflected ultrasound signals back into electronic signals. In a general ultrasound system, the ultrasound energy or received echo intensity data is received as a sector scan of a patient area. The received beam pattern is a group of polar coordinate vectors. Since display devices such as CRTs (cathode ray tubes) are raster (x-y) coordinate devices, the received data must be converted into raster format, i.e., the received data must be converted from a polar coordinate system to an (x-y) coordinate system for display.

In typical systems, raster points on the display are assigned x-y coordinate values. For each raster point, an inverse transformation is performed to identify the polar coordinate input samples closest to the particular raster points. Once the closest polar coordinate points are found, the values associated at that polar coordinate point are assigned to the appropriate raster domain point. Since there are typically more raster points than polar coordinate points, the output raster point does not necessarily exactly coincide with a given input polar coordinate point. Thus, an interpolation must occur between polar coordinate points in order to assign an appropriate point to a raster point of interest. This process must be performed for every point in the raster display.

As is well known, polar and rectangular coordinates conversions may be accomplished using the following relation:

$$y = r\cos\theta \quad \theta = \arctan x/y \qquad (1)$$
$$x = r\sin\theta \quad r = \sqrt{x^2 + y^2}$$

Thus, scan converters (the portions of ultrasound imaging devices which transform the echo intensity from the vector domain to the raster domain) typically require an inverse tangent function to trace back the location of the display pixel in its original azimuth direction and also a square root function to determine the distance R along the beam direction. Whenever the location of the pixel is determined, its value will be calculated from interpolation by using its neighborhood sample points in the polar domain. The arctangent and the square root functions introduce a bottleneck in system performance.

The scan conversion in prior ultrasound devices has been accomplished either through the straightforward coordinates transformation set forth above or through storing precomputed relationships between the raster pixels and a set of vector sample locations while using large memories. Each such method, however, still relies on the computationally intensive arctangent and square root functions.

Accordingly, there is a need for an ultrasound scan conversion method which overcomes these drawbacks of the prior art. There is a still further need for an ultrasound scan conversion method whereby the computationally intensive arctangent and square root functions may be avoided. There is a yet further need for a faster ultrasound scan conversion method.

SUMMARY OF THE INVENTION

These and other drawbacks of the prior art are overcome in large part by an ultrasound scan conversion method according to the present invention. A scan conversion method according to the present invention employs a graphical circle generator to calculate a circle having a predetermined radius in the raster domain. The resulting set of (x,y) points are assigned values from corresponding vector domain points using closest fit and interpolation methods. This process occurs for each value of r in the vector domain. Gaps in the pixel display resulting from quantization errors in the circle generation algorithm are accommodated via a gap interpolation method. In one embodiment, the Bresenham circle generator is employed.

More particularly, a system and method for real time ultrasound scan conversion according to the present invention employs a fast mapping technique on polar coordinate sector scan beam vectors to rectangular coordinate raster pixels for display. The scan converter includes a circular arc generator which generates approximated raster pixels with the same radius. Missing pixels between two successive circular arcs due to quantization error of the arc generator are detected and corrected. The quantization error of approximated raster pixels resulting from the shift of the distance squared of the detected raster pixels with respect to the true assigned radius squared are further corrected. Finally, the improved scan converter includes a method whereby the memory address in the azimuth direction of the beam vectors is redefined such that the location of the detected raster pixels corresponds to its azimuth dimension via a simple comparison computation. The entire process of polar to rectangular coordinate transform accomplished in this scan converter avoids the computationally intensive inverse tangent function and square root computations which are required by conventional scan converters.

BRIEF DESCRIPTION OF THE DRAWINGS

FIG. 4 is a flowchart illustrating operation of a scan conversion process according to one embodiment of the present invention.

DETAILED DESCRIPTION OF THE INVENTION

Figure 1:
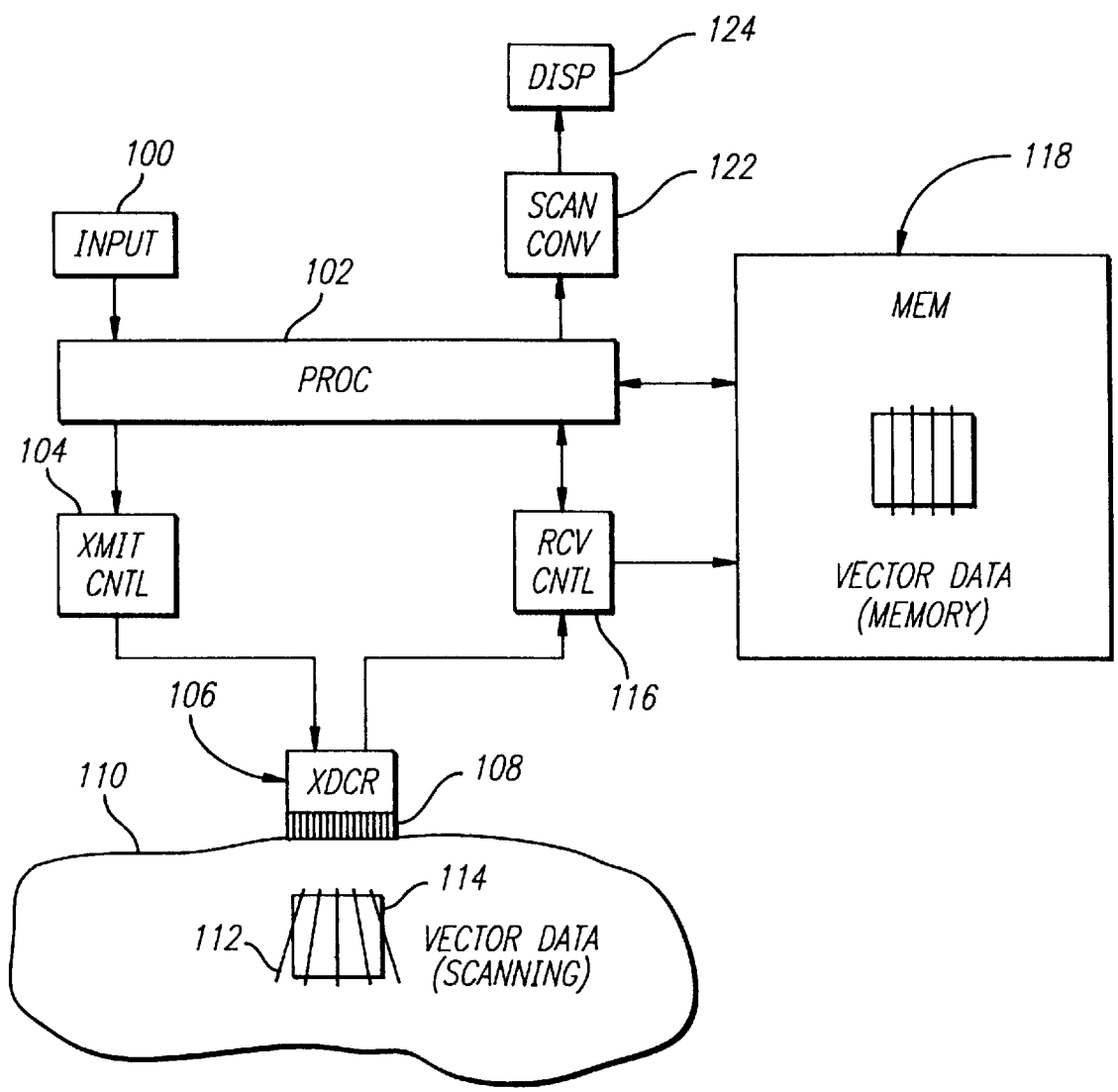
FIG. 1 is a diagram of an ultrasound imaging system according to an embodiment of the present invention.

Turning now to the drawings, and with particular attention to FIG. 1, a block diagram illustrating an ultrasonic imaging system employing scan conversion according to an embodiment of the present invention is shown. An input unit 100 is provided, which typically includes a keyboard or other input mechanism, such as a mouse or track ball. The input unit 100 is used by a user to enter various scan parameters. The input unit 100 is connected to a processing system 102 which typically includes one or more microprocessors and/or digital signal processors. The processing system 102 sets, adjusts and monitors the operating parameters of a transmission control circuit 104 which generates and applies electrical control and driving signals to an ultrasonic probe 106 which includes an array 108 of piezoelectric elements. The piezoelectric elements generate ultrasonic waves when electrical signals of the proper frequency are applied to them. By placing the probe 106 against the body of a patient, the ultrasonic waves enter a portion 110 of the patient's body. By varying the phase amplitude and timing of the driving signals, the ultrasonic waves are focused to form a series of scan lines 112 that typically fan out from the probe. Several such scan lines are shown extending into the patient's body in FIG. 1.

Ultrasonic echoes from the waves transmitted into the body return to the array 108. The piezoelectric elements in the array thereby convert the return mechanical vibrations of the echoes into corresponding electrical signals. Amplification and other conventional signal conditioning is then applied to the return signals by a reception controller 116. This processing includes, as needed, such known signal conditioning as time gating, gain compensation and diffraction compensation in order to identify the echo signals that correspond to each scan plane of the interrogation volume 114. Echo signal data and acoustic intensity values for an image are stored in a memory device 118.

As discussed above, the interrogation region is not normally in the same shape as what the user wants to see displayed and, more particularly, digital acoustic intensity values formed into beams, or digital input vectors V, are normally not in a form suitable for driving a conventional grey tone or color display directly. The acoustic intensity values for an image frame are therefore applied to a scan converter 122 according to the present invention which converts the digital acoustic values into display intensity or brightness values that are suitable to drive a display device 124. The display 124 is typically divided into a pattern of picture elements or pixels that make up an image that the user can view and interpret.

Figure 2A:
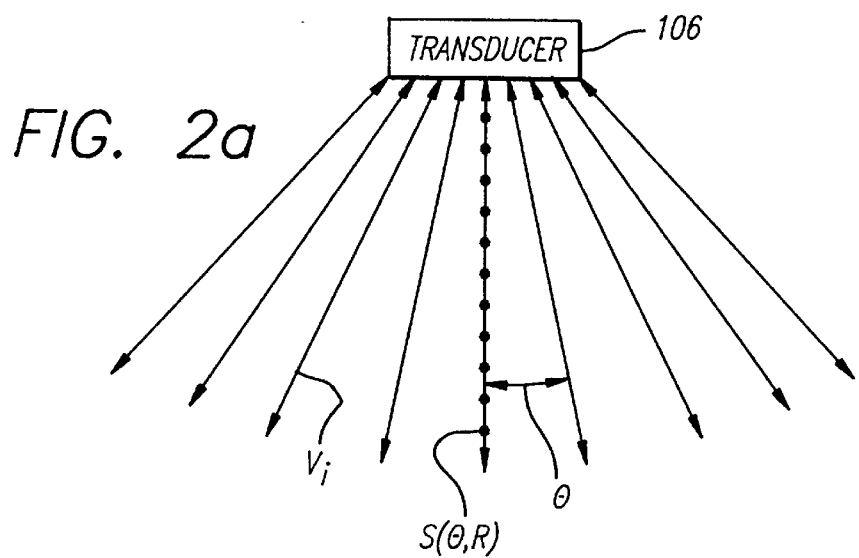
FIGS. 2a–2d are diagrams of vector sample storage and vector sample display according to an embodiment of the present invention.

The ultrasound image, as discussed above, is generated by collecting a predetermined number of acoustical signals. The signals are filtered and beam formed, resulting in a set of digital input vectors V, as shown in FIG. 2a. More particularly, FIG. 2a illustrates a transducer 106 which transmits ultrasound signals and receives ultrasound echoes modeled as a collection of input vectors $V_i$. Each vector has an angular orientation relative to the transducer face. The angle $\theta$ between successive vectors typically is the same. Each vector is stored as a discrete collection of samples S. In one embodiment, each sample is defined in polar coordinates as a function of angle $\theta$ and radius R.

Figure 2B:
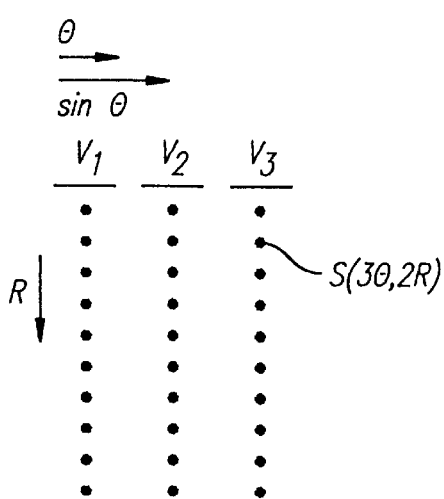

During operation, the transducer 106 scans a patient area in sector fashion resulting in multiple ultrasound input vectors $V_i$. FIG. 2b depicts vector storage as an array of vector points $S(\theta,R)$. These vector points are used to derive a display image by transforming the vector points into raster output pixels. Since the number of input vector points is typically less than the number of output pixels, pixel data is interpolated or otherwise derived from the pattern of input vector values.

Figure 2C:
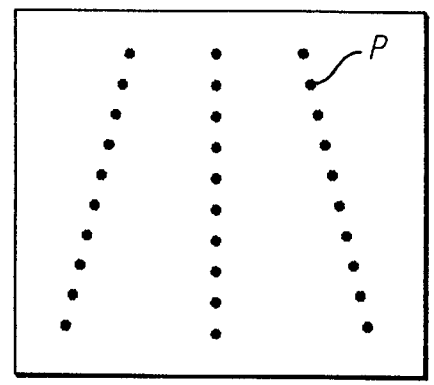
Figure 2D:
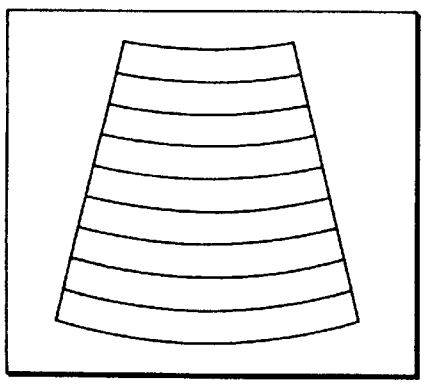

FIG. 2c illustrates corresponding pixel locations for an image without scan conversion. There is a one-to-one correspondence between vector points S and display pixels P. FIG. 2d, on the other hand, illustrates interpolation of additional pixels to achieve additional image resolution.

As discussed above, one method of converting the vector values to pixel data is through the inverse trigonometric function and square root function set forth above. The resulting pixel data is then interpolated according to a known method.

However, as discussed above, the arctangent function and the square root function are computationally intensive. Accordingly, scan conversion according to the present invention employs a graphical circle generator to generate approximated raster pixels with the same radius. In one embodiment, Bresenham's circle generator is employed to generate a circular arc at a given radius R. Points in the raster domain are then compared to corresponding points in the vector domain and interpolation is used to assign values to the corresponding raster domain points. This process is employed for each value of R. Quantization errors in Bresenham's circle generator which result in gaps between two concentric circular arcs, as well as errors due to approximated raster pixels, are detected and corrected.

Furthermore, as will be discussed in greater detail below, because the x increment in the Bresenham circle generator is a constant (i.e., one pixel in the lateral direction), which is equivalent $R\sin\theta$ in the vector domain, the detected raster pixel will be located in its original azimuth direction from a simple check if the address of the beam line is redefined by using $\sin\theta$ rather than $\theta$. Thus, the array S of vectors $V_i$ illustrated in FIG. 2b may be thought of as being functions of $\sin\theta$ and R rather than $\theta$ and R.

More generally, only a 45° circular arc need be considered because the entire circle can be derived from eight symmetrical points based on the half quarter circular arc. The scan converter will now be described beginning with the generation of an arc with center $(x^*, y^*)$ and radius R, where $x^*, y^*$ and R are integers. In Bresenham's circle generator, the algorithm selects the point $P_i$ which is closest to a true circle having radius R and center $(x^*, y^*)$ and minimizes the error term $$D(P_i) = (x_i - x^*)^2 + (y_i - y^*)^2 - R^2 \qquad (2)$$

Figure 3A:
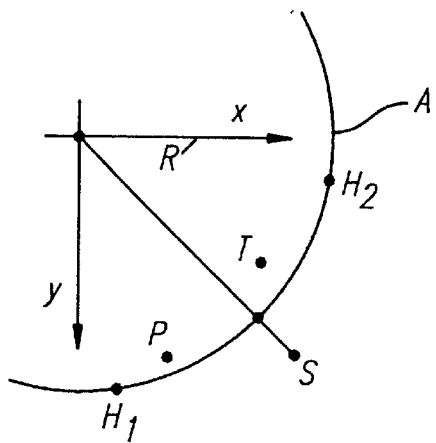
FIGS. 3a–3c are diagrams of circle generation and scan conversion according to an embodiment of the present invention.

Turning to FIG. 3a, a diagram illustrating the system is shown. The points P, S, and T are approximations to the true circle or arc A. The circle A has a radius R'. Points $H_1$ and $H_2$ are points on the circle A, as will be discussed in greater detail below. The distance from the center of the circle to S or T is R. Assuming that the point $P_{i-1}$ has been determined to be the closest the circle for $x=x_{i-1}$, for $x=x_{i-1}+1$, it is determined whether a point $S_i$ or $T_i$ is closest to the circle, where $S_i$ is the point $(x_{i-1}+1, y_{i-1})$ and T is the point $(x_{i-1}+1, y_{i-1}-1)$. Substituting into Equation 2 results in $$D(S_i) = (x_{i-1} + 1 - x^*)^2 + (y_{i-1} - y^*)^2 - R^2 \qquad (3)$$

$$D(T_i) = (x_{i-1} + 1 - x^*)^2 + (y_{i-1} - 1 - y^*)^2 - R^2$$

The differences set forth in Equation 3 above are the differences between the squared distances from the origin (the center of the circle) to $S_i$ (or to $T_i$) and to the actual circle. If the absolute value of $D(S_i)$ is greater than the absolute value of $D(T_i)$, then $T_i$ is closer to the actual circle than is $S_i$. However, if the absolute value of $D(S_i)$ is less than the absolute value of $D(T_i)$, then $S_i$ is closer to the actual circle than $T_i$. Since $D(S_i)$ is always positive, and $D(T_i)$ is always negative, the decision can be made by looking at the sign of $d_i$, where $$\begin{aligned} d_i &= D(S_i) + D(T_i) \qquad (4) \\ &= 2(x_{i-1} + 1 - x^*)^2 + (y_{i-1} - y^*)^2 + (y_{i-1} - 1 - y^*)^2 - 2R^2 \end{aligned}$$

Thus, if $d_i$ is greater than 0, then $T_i$ is selected; otherwise $d_i$ is less than or equal to 0 and $S_i$ is selected. To simplify calculation of the decision variable of Equation 4, a recursive formula may be determined. Starting from $(x_0, y_0)=(x^*, y^*+R)$, $d_1$ will be $$d_1 = -2R \tag{5}$$

Furthermore, $$d_{i+1} - d_i = \tag{6}$$
$$2(x_i - x_{i-1})(x_i + x_{i-1} + 2 - 2x^*) + 2(y_i - y_{i-1})(y_i + y_{i-1} - 1 - 2y^*)$$

Now, if $d_i$ is greater than zero, then $T_i$ is selected, i.e., using $x_i = x_{i-1}+1$ and $y_i = y_{i-1}-1$, such that $$d_{i+1} = d_i + 4(x_{i-1}-x^*) - 4y_{i-1} - y^*) + 10 \tag{7}$$

Otherwise, $d_i$ is less than or equal to 0, so that $S_i$ is selected, i.e., using $x_i = x_{i-1}+1$ and $y_i = y_{i-1}$ such that $$d_{i+1} = d_i + 4(x_{i-1}-x^*) + 6 \tag{8}$$

By using Equations 7 and 8, the approximated raster pixels having the same radius (i.e., depth) may be determined. Thus, for each value of R, an approximate circular arc in the raster domain is determined which similarly has approximately the same depth or radius from the circle's center in the vector domain. The result is a concentric series of approximate circles in the raster domain. It is noted that while the arc generation described above has been so described with respect to Bresenham's circle generator, other arc generation algorithms, such as Pitteway's circle generator, may be employed.

It is, of course, insufficient for scan conversion to merely generate a set of concentric circles in the raster domain. The raster domain points must also be associated with vector domain points and values assigned. To accomplish this, it is necessary to back-convert the raster domain points into vector domain points. It is noted, however, that quantization errors in the circle generator mean that a direct one-to-one transformation cannot occur. Rather, an approximation must be derived to correct for the quantization errors. In one embodiment of the invention, a linear approximation of a quadratic function to correct the quantization error is employed.

As with $D_i$, $D(S_i)$ and $D(T_i)$ can be estimated recursively from initial values of $D(T_1)=2(1-R)$ and $D(S_1)=1$ to yield Equations 9 and 10.

$$D(T_{i+1}) = \begin{cases} D(T_i) + 2(x_{i-1} - x^*) + 3 & \text{if } d_i \leq 0 \\ D(T_i) + 2(x_{i-1} - x^*) - 2(y_{i-1} - y^*) + 6 & \text{otherwise} \end{cases} \tag{9}$$

$$D(S_{i+1}) = \begin{cases} D(S_i) + 2(x_{i-1} - x^*) + 3 & \text{if } d_i \leq 0 \\ D(S_i) + 2(x_{i-1} - x^*) - 2(y_{i-1} - y^*) + 4 & \text{otherwise} \end{cases} \tag{10}$$

Figure 3B:
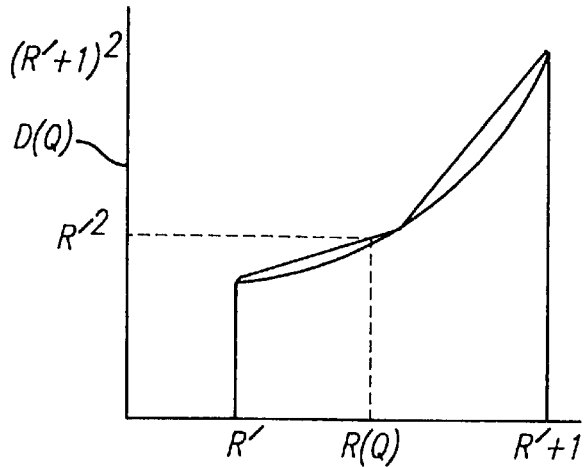

As noted above, these equations represent the differences between the squared distances from the origin of the circle to the respective points. From Equations 9 and 10, which are quadratic functions, the actual distance R', defined from the apex $(x^*,y^*)$ to the raster pixel Q, where Q is any point, can be approximated by a linear interpolation to a quadratic function. Thus, the quadratric function going through $(R, R^2)$ to $(R+1, (R+1)^2)$ will be approximated by a piecewise linear function from $(R, R^2)$, $((R+½), (R+½)^2)$ to $(R+1, (R+1)^2)$, as set forth in FIG. 3b. Therefore, the exact distance R' between the origin and the raster point Q will be R+ΔR with $$\Delta R = \begin{cases} \dfrac{2D}{4R-1} & \text{if } D(Q) < 0 \\ \dfrac{2D}{4R+1} & \text{if } 0 < D(Q) < R+1 \\ \dfrac{2D+1}{4R+3} & \text{if } R+1 \leq D(Q) < 2R+1 \end{cases} \tag{11}$$

Thus, D(Q) is the error of the radius squared at the raster pixel Q and Equation 11 provides the correction for the radius to the point Q such that the new radius R' will be the actual depth in the vector domain.

Having determined an appropriate depth R in the vector domain, the angular offset of a raster pixel Q(x, y) also must be determined. This may be determined by using the current depth R and its radius offset, ΔR of Equation 11. From FIG. 3c it may be observed that the raster pixel Q(x,y) has the same angle as an arc point H in the vector domain. For a particular scanning geometry, the following can be computed:

$$\Theta_x[i] = \sin\theta_i \text{ and } \Theta'_x[i] = \sin\theta_i - \sin\theta_{i-1} \tag{12}$$

where $\theta_i$, $0 \leq i < N$ is the scanning angle at the ith beam line.

Figure 3C:
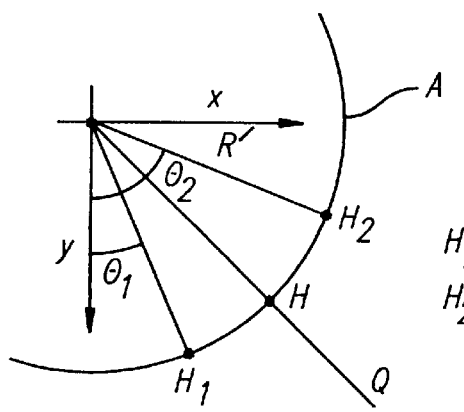

The angular offset of the point H of FIG. 3c can, therefore, be obtained by Equation 13:

$$\Delta\Theta_x(H) = \dfrac{x' - \Theta_x(j)}{\Theta'_x(j+1)} \tag{13}$$

where j and j+1 are the indices of points $H_1$ and $H_2$ in the azimuth direction of R in the vector domain.

The x-component of H is estimated by Equation 14:

$$x' = \dfrac{x_i}{R + \Delta R} \tag{14}$$

where x defines the x component of Q.

The value x' of Equation 14 is a dimensionless ratio which can be used to locate the nearest neighborhood raster pixels to raster pixel Q(x,y).

To speed up the searching process of the two nearest neighborhood of the detected raster pixels from a given x' of Equation 14, one can do a one time searching for the maximum depth and save the index to a vector. For the next step, the searching process of each raster pixel only requires a few comparisons with the help of the previous saved index vector.

As noted above, the quantization error of the circle generator induces not only errors in $\theta$ and R but can also result in missing pixels between two successive radii in the raster domain. This missing point can be detected by examining the pixel one below the current one and computing the error with respect to the current radius, i.e., $$D(G_i) = (x_{i-1}+1-x^*)^2 + (y_{i-1}+1-y^*)^2 - R^2 \tag{15}$$

Equation 15 itself may be computed by using $D(S_i)$ or $D(T_i)$ and Equation 16:

$$D(G_i) = \begin{cases} D(S_i) + 2(y_{i-1} - y^*) + 1 & \text{if } S_i \text{ is selected} \\ D(T_i) + 2(y_{i-1} - y^* - 1) + 1 & \text{if } T_i \text{ is selected} \end{cases} \tag{16}$$

As with points originally found, it is necessary to correct for quantization errors and determine appropriate vector domain points, using Equations 12–14.

Turning now to FIG. 4, a flowchart 400 illustrating a method according to one embodiment of the present invention is shown. An initialization occurs in a step 402. Initialization may include, for example, determining starting points in the raster domain.

Next, in a step 404, one or more circular arcs having radii approximately equal to predetermined vector domain radii are generated using a graphics arc or circle generator. As discussed above, Bresenham's circle generator may be employed. Other graphical arc or circle generators are contemplated, however. In a step 406, quantization errors introduced by the circle generator are corrected, by determining, for example, more accurate values for R and the angle. In a step 408, the appropriate vector points are determined. In a step 410, values at the vector points found in step 408 are interpolated, where necessary, and assigned to corresponding raster domain pixels. Once the raster domain pixels determined by step 404 have had values assigned to them in step 410, it is determined whether or not gap pixels exist in a step 412. If any gap pixels exist, then the points are identified in a step 414. The gap pixels are then processed in steps 406 through 410. It is noted that processing of gap pixels can occur in between arc generation in step 404(i.e., after two concentric arcs have been determined). Thus, FIG. 4 is exemplary only.

Figure 5A:
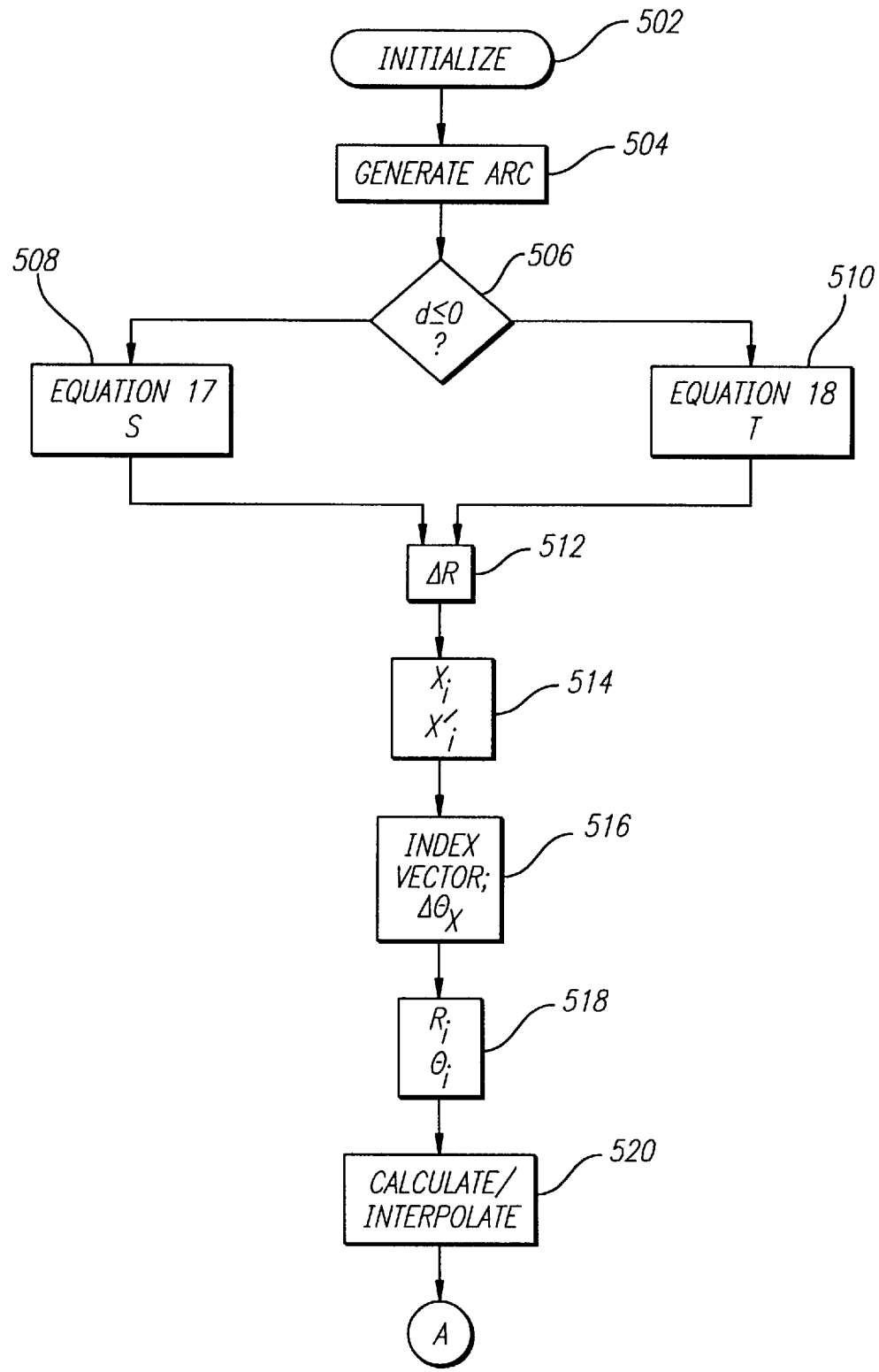
FIGS. 5a–5b are a flowchart illustrating an exemplary embodiment of the scan conversion process according to FIG. 4.
Figure 5B:
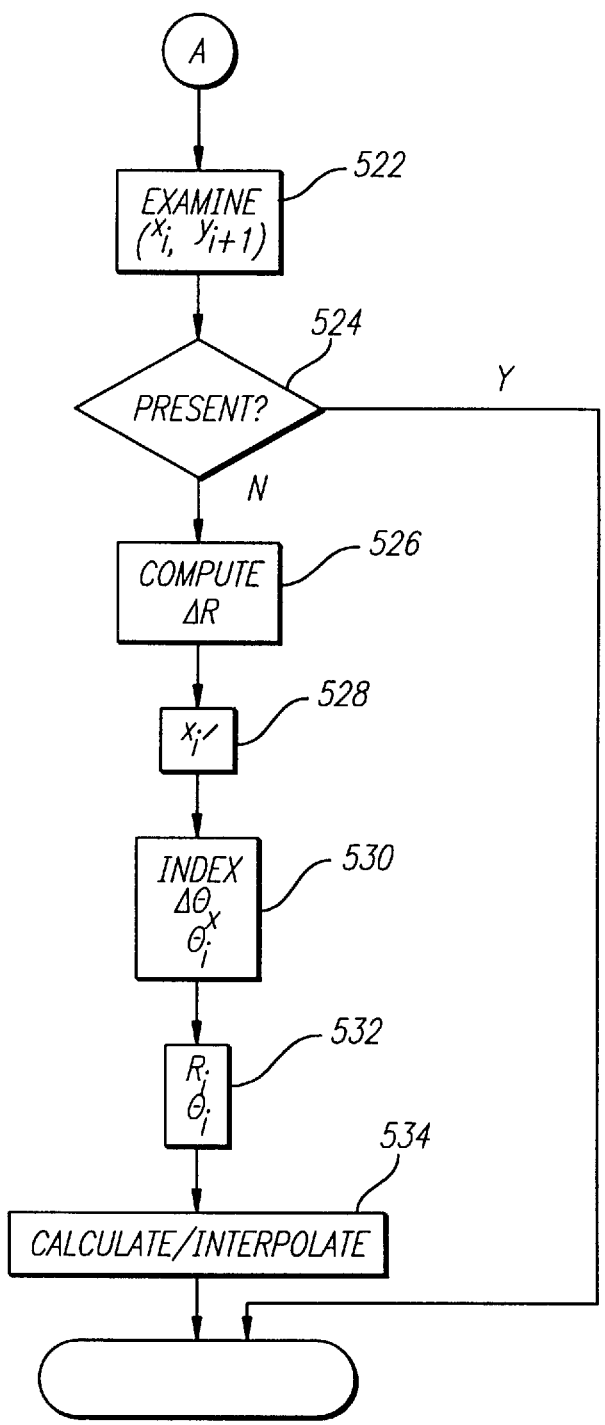

Turning now to FIGS. 5a and 5b, a flowchart illustrating an exemplary embodiment of scan conversion according to the present invention is shown. Exemplary code corresponding to the flowchart of FIG. 5a–5b is attached hereto as an appendix. In the embodiment shown in FIGS. 5a–5b, Bresenham's circle generator is employed. Briefly, the scan converter starts from the maximum depth R, generates a circular arc from 0° to 45°, determines the correct position of the raster domain point in the corresponding vector domain and performs necessary interpolations to assign values to the corresponding raster domain points. The process continues by decreasing the depth by one in every iteration.

An initialization is performed in a step 502. An initial point $(x_i, y_i)=(0,R)$, where R is the current depth, is determined, as are $d_i=3-2R$, $d(T_i)=2(1-R)$ and $d(S_1)=1$. A circular arc is iteratively generated in a step 504, having radii corresponding approximately to the radius R in the vecter domain. The x-coordinate is successively incremented, and the y-coordinate decremented from R where necessary. In addition, $d_i$ is calculated for each point. If $d_i \leq 0$, as determined in a step 506, then in a step 508, values according to the Equations 17 are calculated:

$$D = d(S_i) \quad (17)$$

$$d_{i+1} = d_i + 4x_{i-1} + 6$$

$$d(T_{i+1}) = d(T_i) + 2x_{i-1} + 3$$

$$d(S_{i+1}) = d(S_i) + 2x_{i-1} + 3$$

If, in step 508, $d_i$ was determined to be greater than zero, then in a step 510, the calculations in Equation 18 below are performed:

$$D = d(T_i) \quad (18)$$

$$d_{i+1} = d_i + 4(x_{i-1} - y_{i-1}) + 10$$

$$d(T_{i+1}) = d(T_i) + 2(x_{i-1} - y_{i-1}) + 6$$

$$d(S_{i+1}) = d(S_i) + 2(x_{i-1} - y_{i-1}) + 4$$

$$y_i = y_{i-1} - 1$$

In a step 512, ΔR is calculated according Equation 11 above. In a step 514, the x component is incremented, x' is calcu-lated from Equation 14, and $\Theta_x$ and $\Theta_x'$ are calculated from Equation 12 above.

At this point, the correct radius in vector domain has been determined, and the correct angle must now be determined. As discussed above, the vector domain array was configured to be addressable as an array function of radius R and sin θ. Thus, indexing the array and stepping through appropriate values will give the correct azimuthal position. Moreover, initialization of the index vector need only occur for one value of R. Index vectors for other values of R can be determined by a simple comparison.

Thus, in a step 516, the index vector for $R_{max}$ is determined. So long as $x_i' \geq \Theta_x(j)$, (where j is an index value related to i by index(i)=j−1), then $\Delta\Theta_x$ is calculated according to Equation 19:

$$\Delta\Theta_x = \frac{(x_i' - \Theta_x(j-1))}{\Theta_x'(j)} \quad (19)$$

The remaining index values (i.e., indices for other depths) simply use the already determined index. The raster domain point is then determined to be, in vector domain, in a step 518, as in Equation 20:

$$R_i = R + \Delta R, \quad \Theta_i = \Theta_x[j-1] + \Delta\Theta_x \quad (20)$$

Once the appropriate vector domain coordinates have been determined, an interpolated value at $(R, \Theta)$ is determined and assigned to (x,y), in a step 520.

Once the circular arcs have been determined in the raster domain, the existence of gap pixels must be determined. The pixel $(x_i, y_i+1)$ is examined in a step 522. If it has been assigned a value already (step 524), then the process ends. If, however, the pixel has not been assigned a value, then in a step 526, ΔR is calculated according to Equation 21:

$$\Delta R = \begin{cases} \dfrac{2D(g_i)}{4R-1} & \text{if } D(g_i) < 0 \\ \dfrac{2D(g_i)}{4R+1} & \text{if } 0 < D(g_i) < R+1 \\ \dfrac{2D(g_i)+1}{4R+3} & \text{otherwise} \end{cases} \quad (21)$$

Again, the x component of the circular arc point $x_i'$ is calculated according to Equation 14 in a step 528. In a step 530, the appropriate index is used (from the previously determined index vector) to compute $\Delta\Theta_x$ and $\Theta_i$. In a step 532, the location of $(x_i, y_i+1)$ is determined to be $R_i=R+\Delta R$ and $\Theta_i=\Theta_i$ in vector domain. Finally, the appropriate values are interpolated and assigned to the point $(x_i, y_i+1)$ in a step 534.

Finally, it is noted that a smoothing or threshold function may be applied to the 45° boundary, since round-off errors at Rsin45 may be incurred. More particularly, at x=INT (Rsin45+0.5), x' of Equation 14 may be compared with $\Theta_x[N-1]+\epsilon$, where ε is a rounding error (e.g., 0.001). If x' is greater, then the current pixel is set to image background. If $\Theta_x[N-1]<x'<\Theta_x[N-1]+\epsilon$, then x' is set to $\Theta_x[N-1]$, and the interpolation continues. In this fashion, the boundary can be smoothed.

APPENDIX

Algorithm: A fast scan conversion algorithm for ultrasound sector scanning (0) Initialization: start from $(x_i, y_i)=(0,R)$ where R is the current depth. Compute $d_i=3-2R$, $d(T_1)=2(1-R)$, and $d(S_1)=1$.

(1) generate a circular arc from 0° to 45°, i.e., repeat i from 1 to Rsin 45°, incremented by 1:

if $d_i \leq 0$ then compute $D = d(S_i)$ $d_{i+1} = d_i + 4x_{i-1} + 6$ $d(T_{i+1}) = d(T_i) + 2x_{i-1} + 3$ $d(S_{i+1}) = d(S_i) + 2x_{i-1} + 3$ endif
if $d_i > 0$ then compute $D = d(T_i)$ $d_{i+1} = d_i + 4(x_{i-1} - y_{i-1}) + 10$ $d(T_{i+1}) = d(T_i) + 2(x_{i-1} - y_{i-1}) + 6$ $d(S_{i+1}) = d(S_i) + 2(x_{i-1} - y_{i-1}) + 4$ $y_i = y_{i-1} - 1$ endif
(2) compute the error of the estimated radius:

$$\Delta R = \begin{cases} \dfrac{2D}{4R-1} & \text{if } D < 0 \\ \dfrac{2D}{4R+1} & \text{if } 0 < D < R+1 \\ \dfrac{2D+1}{4R+3} & \text{otherwise} \end{cases}$$

(3) update $x_i$ and compute the x-component of a circular arc point which is along the same radius line with $(x_i, y_i)$:

$x_i = x_i + 1$ $x'_i = \dfrac{x_i}{R + \Delta R}$ (4.0) initialize the integer vector if index[i] which should be computed once, i.e., only for the maximum depth:
for $(; x'_j \geq \Theta_x[j]; j++)$;
index[i]=j−1, and $\Delta\Theta_x = (x'_i - \Theta_x[j-1])/\Theta'_x[j]$. The location of $(x_i, y_i)$ in $(R,\theta)$ domain will be $R_j = R + \Delta R$, $\Theta_i = \Theta_x[j-1] + \Delta\Theta_x$.
(4.1) for other depths, look for the right index with the help of the previous index vector:
for $(k=\text{index}[i]+1; x'_i > \Theta_x[k]; k++)$;
index[i]=k−1, and $\Delta\Theta_x = (x'_i - \Theta_x[k-1])/\Theta'_x[k]$. The location of $(x_i, y_i)$ in $(R,\theta)$ domain will be $R_i = R + \Delta R$, $\Theta_i = \Theta_x[k-1] + \Delta\Theta_x$.
(5) Compute the interpolated value at $(R_i, \Theta_i)$ and assign it to $(x_i, y_i)$.
(6) look if the pixel at $(x_i, y_i+1)$ has been checked; if not, continue the following gap pixel processing:
  (a) compute the error of the estimated radius:

$$\Delta R = \begin{cases} \dfrac{2D(g_i)}{4R-1} & \text{if } D(g_i) < 0 \\ \dfrac{2D(g_i)}{4R+1} & \text{if } 0 < D(g_i) < R+1 \\ \dfrac{2D(g_i)+1}{4R+3} & \text{otherwise} \end{cases}$$

where $D(g_i) = D + 2y_{i+1}$ and D has been computed from Item (1).

(b) compute the x-component of a circular arc point, $x'_i = \dfrac{x_i}{R + \Delta R}$ (c) look for the right index with the help of the previous index vector:
    for $k = \text{index}[i]$
    if $(x'_i < \Theta_x[k])$ then
    for $(k=k-1; x'_i < \Theta_x[k]; k--)$;
    Compute $\Delta\Theta_x = (x'_i - \Theta_x[k])/\Theta'_x[k+1]$ and $\Theta_i = \Theta_x[k] + \Delta\Theta_x$.
    endif
    if $(x'_{x \geq \Theta_x}[k])$ then
    for $(k=k+1; x'_i > \Theta_x[k]; k++)$;
    Compute $\Delta\Theta_x = (x'_i - \Theta_x[k-1])/\Theta'_x[k]$ and $\Theta_i = \Theta_x[k-1] + \Delta\Theta_x$.
    endif
  (d) the location of $(x_i, y_i+1)$ in $(R,\theta)$ domain will be $R_i = R + \Delta R$ and $\Theta_i$.
  (e) Compute the interpolated value at $(R_i, \Theta_i)$ and assign it to $(x_i, y_i+1)$

What is claimed is:

1. A method for scan converting data from vector domain to raster domain, comprising:
determining a plurality of raster domain pixels defining an of arc having a predetermined radius;
using said raster domain pixels to determine a plurality of approximately closest ultrasound samples in said vector domain; and
assigning values to said raster domain pixels, said values being derived from said approximately closest ultrasound samples.

2. A method for scan converting according to claim 1, wherein said assigning comprises interpolating said ultrasound samples.

3. A method for scan converting according to claim 1, further comprising correcting for errors in locating said raster domain pixels.

4. A method for scan converting according to claim 3, wherein said correcting comprises using linear interpolation to correct for said errors.

5. A method for scan converting according to claim 1, wherein said determining comprises using Bresenham's circle generator.

6. A method for scan converting according to claim 1, wherein said determining comprises employing a Pitteway circle generator.

7. A scan converter configured to convert data from vector domain to raster domain, comprising:
means for determining a plurality of raster domain pixels defining a plurality of generally concentric arcs;
means for using said raster domain pixels to determine a plurality of approximately closest ultrasound samples in said vector domain; and
means for assigning values to said raster domain pixels, said values being derived from said approximately closest ultrasound samples.

8. A scan converter according to claim 7, wherein said assigning means includes means for interpolating approximately closest ultrasound samples.

9. A scan converter according to claim 7, wherein said using means includes means for correcting for errors in locating said plurality of raster domain pixels.

10. A scan converter according to claim 9, wherein said correcting means includes means for using linear interpolation to correct for said errors.

11. A scan converter according to claim 9, wherein said determining means includes means for determining gap pixels located between generally said concentric arcs.

12. A scan converter according to claim 7, wherein said determining means uses Bresenham's circle generator.

13. A scan converter according to claim 7, wherein said determining means uses a Pitteway circle generator.

14. An ultrasound imaging system, comprising:

a transducer configured to transmit and receive a plurality of ultrasound signals;

a scan converter operably coupled to said transducer, said scan converter configured to convert said ultrasound signals from vector domain to raster domain by using a graphical curve generator to derive a plurality of raster domain pixels from said ultrasound signals of said vector domain; and a display device configured to display said raster domain pixels.

15. An ultrasound imaging system according to claim 14, wherein said graphical curve generator employs a Bresenham circle generator.

16. An ultrasound imaging system according to claim 14, wherein said scan converter is further configured to correct for quantization errors resulting from said use of said graphical curve generator.

17. An ultrasound imaging system according to claim 16, wherein said scan converter is configured to correct for said quantization errors by comparing squares of distances from estimated circle origins to points in said raster domain.

18. An ultrasound imaging system according to claim 15, wherein said scan converter is further configured to identify gap pixels in said raster domain, said gap pixels being pixels not associated with a curve in successive iterations of said Bresenham's circle generator.

19. An imaging system, comprising:

means for defining an arc represented by a plurality of pixels in a Cartesian coordinate domain; and means for correlating digital intensity values of a plurality of samples from a polar coordinate domain with said pixels.

20. An imaging system according to claim 19, wherein said generating means includes means for generating sets of generally concentric circles in said Cartesian coordinate domain.

21. An imaging system according to claim 20, wherein said generating means includes means for identifying gaps between said generally concentric circles.

22. A method for scan converting data from a vector domain to a raster domain, in an ultrasound imaging system, comprising:

selecting a plurality of pixels in said raster domain representing a plurality of concentric circular arcs, said circular arcs each having a respective radius;

mapping at least one of said pixels to a plurality of ultrasound samples indicated by polar coordinates in said vector domain, each of said samples having a radial coordinate approximately equal to said radius of one of said circular arcs; and interpolating said ultrasound signals to produce an intensity value for said at least one of said pixels.

23. The method of claim 22, further comprising:

correcting quantization errors in said radius of each of said circular arcs.

24. The method of claim 22, further comprising:

setting radii of said circular arcs to be approximately equal to radial coordinates of said ultrasound samples.

25. The method of claim 22, further comprising:

identifying at least one gap pixel located between said circular arcs in said raster domain.

26. The method of claim 25, further comprising:

interpolating a second plurality of ultrasound signals to produce an intensity value for said at least one of gap pixel.

27. The method of claim 22, further comprising:

indexing said ultrasound signals in a memory device according to an angular coordinate.

* * * * *